T. R. MARKILLIE.
Wheel-Plow.
No. 28,759. Patented June 19, 1860.
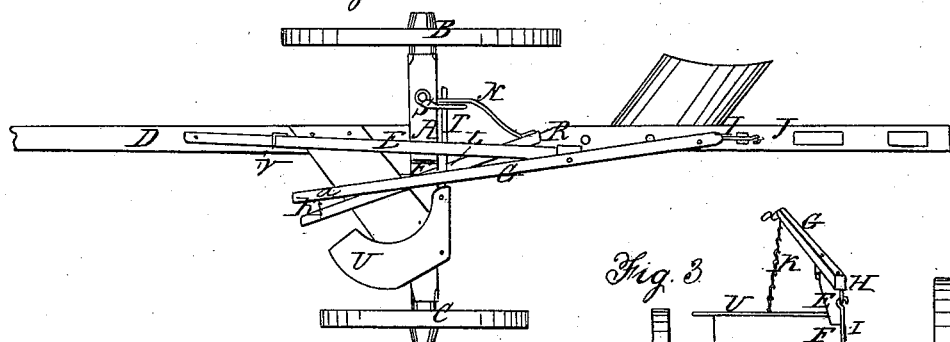
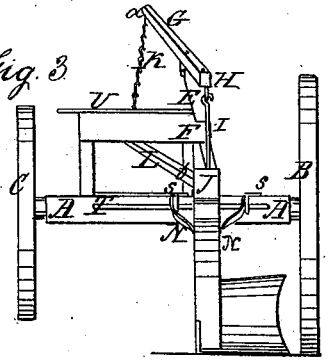
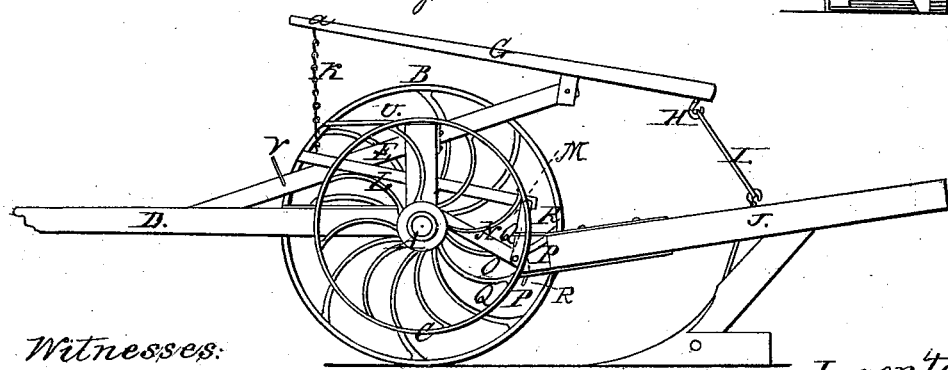
Witnesses:
John P. Jacobs
Inventor:
Thos. R. Markillie

United States Patent Office.

THOMAS R. MARKILLIE, OF WINCHESTER, ILLINOIS.

IMPROVEMENT IN PLOWS.

Specification forming part of Letters Patent No. 28,759, dated June 19, 1860.

*To all whom it may concern:*

Be it known that I, THOMAS R. MARKILLIE, of Winchester, in the county of Scott and State of Illinois, have invented a certain new and useful Improvement in Plows, of which the following is a full, clear, and exact description, reference being had to the accompanying drawings of the same, making part of this specification, in which—

Figure 1 represents a plan of my improved plow; Fig. 2, a side and Fig. 3 a rear elevation of the same.

My improvement relates to that class of plows attached to truck-carriages; and it consists in a new and improved mode of connecting the plow to the truck, by means of which, in passing round curves, &c., the plow is made to follow in the curve described by the truck, and by means of which, notwithstanding the truck may rise over little inequalities in the ground, stones, &c., the plow is still left unaffected and continues on without changing its relative depth of furrow, when used in connection with levers suitably arranged for the purpose of raising or depressing the plow at will, by means of which it is brought more completely within the control of the operator than by any of the old methods, and by which it can be elevated above the soil entirely and there held in place for the purposes of transportation from field to field, &c.

To enable others skilled in the art to make, construct, and use my improvements, I will now proceed to describe it in detail, omitting a particular description of such parts of the machine as is not essential to a full understanding of my invention.

The plow is represented in the drawings as being attached to the rear of the axle A of a truck-carriage mounted on two wheels, B and C, the one larger than the other, its diameter being greater than the other—say about eight inches, or the average depth of a good furrow— the object of which is to keep the axle horizontal, to do which the one wheel (the large one) is made to run in the last furrow and the other on the unplowed land.

To the front of the axle is secured the tongue D in any suitable and well-known manner, from which rises an inclined bearer, E, supported at or near its middle by a standard, F, rising from the upper side of the axle to which it is bolted. The rear end of this bearer acts as a support or fulcrum for a lever, G, pivoted to its sides, from the rear of which depends a hook, H, to which is connected one end of a link, I, the other end of which is attached in a similar manner to a hook secured to the upper side of the plow-beam J. By means of this lever the depth of the furrow is controlled, as by depressing its forward end it raises the plow, and vice versa. This lever also serves the purpose of keeping the plow in the ground where it is either hard or stony, as by raising its forward end and keeping it there it will depress the plow and keep it there through the link I.

On the forward end of the lever G is secured a hook, $a$, by means of which and a chain, K, it can be connected with another lever, L, arranged beneath it, and also having its fulcrum on the standard by a pivot, $b$, passing through it into the standard. To the rear end of this lever depend two hinged or jointed curved plates, M, between which and to the lower ends of which is connected a sort of V-shaped link, N, that connects the plow to the truck by means of a pivot, O, passing through the curved plates M, forward end of the V-shaped link N, and swivel P, to the ends of which the plow is directly attached, the swivel for this purpose being mounted between the sides of the V-shaped link and in a vertical plane, and having its ends rounded or circular, so as to permit the plow to swivel on them in a horizontal plane or by it in a vertical plane. The two ends of the swivel P for this purpose take into bearings Q, formed in the projecting end of straps R, of metal, secured on the upper and lower sides of the front end of the plow-beam. As before said, the link N, which connects the plow to the truck, is V-shaped, having its apex next the plow and the end of its two diverging sides next the truck, in which are pierced holes by which it is connected to lugs S, secured to the axle of the truck by means of a bolt, T, passing through them. This mode of connecting the link to the truck allows its forward end to play up and down in a vertical plane, and hence enables the point of the plow either to be depressed or raised to plow deep or shallow, as required, or to be lifted out of the ground entirely, in the manner about to be described.

As the construction of the plow forms no part of my present improvement, it is sufficient to state that it may be made in any well-known manner, omitting the handles of the plow, which for my purposes are unnecessary, as it is intended to be used and guided by the movements of the truck and horses, as guided by the driver alone, a seat, U, for whom is provided on the truck immediately over the axle; and it may be remarked that any required number of plows may be used, the axle being lengthened to accommodate them; but as a rule two will be as many as can be conveniently operated by one person, unless the various levers are connected together in such manner as to be governed and operated as well simultaneously as singly, which can easily be effected, and therefore, as the operation would be the same whether one or more were used, I will simply describe the operation of one.

The plow is first depressed to the necessary depth by raising the forward end of the lower lever, L, which, acting on the V-shaped link and swivel, depresses the point of the plow through its beam, after which it is connected to the upper end by means of the chain K and hook H of the upper lever, G, which has the effect of keeping the plow in the ground to the same depth. When it is desired to increase or lessen the depth the chain is unhitched and the lower lever operated, so as to effect the result required, and again attached to the upper lever, so as to have an equal strain as well on its front as its rear end.

Should the plow, because of the hardness of the ground or from any other cause, have a tendency to run out of the ground, by raising the forward end of the upper lever it will, through the link I at its rear end, depress and hold the plow down; or the same effect may be produced by depressing the rear end of the lower lever. By hinging the V-shaped link to the rear of the axle and attaching the plow to its forward end by a swivel any inequalities of the ground will be surmounted by the wheels of the truck without communicating to the plow the same motion, as the truck simply turns on the hinge of the V-shaped link, and while it may raise that end of the link it does not the other, as it simply turns on the pivot O, that connects it to the curved plates M, which depend from the rear end of the lower levers.

By making the connecting-link N V-shaped and attaching its diverging ends to the truck it will be seen that the plow is made to follow precisely in the same track as that of the truck wheels, and hence to describe the same curve as it—a point of great importance, and which could not be effected by a simple link of one arm attached to the axle—which has the effect of making the plow follow in the most direct lines, and therefore, in plowing around ravines, breaks in the ground, &c., leaving spots entirely unturned or unplowed.

When it is desired to transport the plow from the farm-yard to the field or from one field to another all that is necessary to do is simply to depress the forward end of the upper lever until it is brought in contact with the upper side of the bearer E and slip over its end the loop V, attached to the bearer, and the plow will be suspended from the truck sufficiently high above the ground to enable it to be wheeled by the truck wherever desired.

Having thus described my invention, what I claim as new, and desire to secure by Letters Patent, is—

The arrangement of the plow or plows as connected to the truck, in combination with the levers G and L, the whole being constructed and operated in the manner and for the purposes described.

In testimony whereof I hereunto set my hand.

THOS. R. MARKILLIE.

Witnesses:
L. MANN,
JOHN P. JACOBS.